(12) United States Patent
Onoda et al.

(10) Patent No.: US 7,452,607 B2
(45) Date of Patent: *Nov. 18, 2008

(54) GLASS FOR COVERING ELECTRODE

(75) Inventors: Hitoshi Onoda, Yokohama (JP); Yu Goshima, Kawasaki (JP); Yumiko Aoki, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/943,667

(22) Filed: Nov. 21, 2007

(65) Prior Publication Data

US 2008/0081198 A1  Apr. 3, 2008

Related U.S. Application Data

(62) Division of application No. 11/581,400, filed on Oct. 17, 2006, now abandoned.

(51) Int. Cl.
*B32B 17/00* (2006.01)
*C03C 3/064* (2006.01)
*C03C 3/066* (2006.01)

(52) U.S. Cl. .......... 428/432; 428/426; 428/433; 428/434; 313/582; 313/583; 345/60; 345/71; 501/15; 501/24; 501/26; 501/53; 501/63; 501/65; 501/66; 501/67; 501/73; 501/77

(58) Field of Classification Search .......... 501/15, 501/24, 26, 53, 63, 65, 66, 67, 73, 77; 428/426, 428/432, 433, 434; 313/582, 583; 345/60, 345/71

See application file for complete search history.

(56) References Cited

U.S. PATENT DOCUMENTS

| 4,433,092 | A |  | 2/1984 | Nemeth |  |
|---|---|---|---|---|---|
| 5,137,849 | A |  | 8/1992 | Brix et al. |  |
| 5,308,803 | A |  | 5/1994 | Clifford et al. |  |
| 6,149,482 | A | * | 11/2000 | Sakasegawa et al. | 445/24 |
| 6,346,493 | B1 |  | 2/2002 | Kniajer et al. |  |
| 6,376,400 | B1 | * | 4/2002 | Fujimine et al. | 501/49 |
| 6,475,605 | B2 | * | 11/2002 | Hayakawa et al. | 428/210 |
| 6,497,962 | B1 | * | 12/2002 | Fujimine et al. | 428/426 |
| 6,534,346 | B2 | * | 3/2003 | Kosokabe | 438/127 |
| 6,617,789 | B2 | * | 9/2003 | Onoda et al. | 313/586 |
| 6,623,325 | B2 | * | 9/2003 | Tsuruoka et al. | 445/24 |
| 7,033,534 | B2 | * | 4/2006 | Chiu et al. | 264/496 |
| 7,057,342 | B2 | * | 6/2006 | Aoki et al. | 313/583 |
| 7,208,430 | B2 | * | 4/2007 | Hasegawa et al. | 501/15 |
| 7,326,666 | B2 | * | 2/2008 | Yamamoto et al. | 501/67 |
| 2005/0113241 | A1 | * | 5/2005 | Yamamoto et al. | 501/67 |
| 2005/0231118 | A1 | * | 10/2005 | Fujimine et al. | 313/586 |
| 2006/0148635 | A1 |  | 7/2006 | Miyauchi et al. |  |
| 2006/0276322 | A1 | * | 12/2006 | Hasegawa et al. | 501/49 |
| 2007/0078042 | A1 | * | 4/2007 | Yoneyama | 477/125 |
| 2007/0236147 | A1 |  | 10/2007 | Onoda |  |

FOREIGN PATENT DOCUMENTS

| JP | 11-15148 | 1/1999 |
|---|---|---|
| JP | 11-92168 | 4/1999 |
| JP | 2001-31446 | 2/2001 |
| JP | 2001-195989 | 7/2001 |
| JP | 2003-20251 | 1/2003 |
| JP | 2003-160359 | 6/2003 |
| JP | 2004-146357 | 5/2004 |

OTHER PUBLICATIONS

U.S. Appl. No. 11/643,667, filed Nov. 21, 2007, Onoda, et al.

* cited by examiner

*Primary Examiner*—Anthony J Green
(74) *Attorney, Agent, or Firm*—Oblon, Spivak, McClelland, Maier & Neustadt, P.C.

(57) ABSTRACT

Provided is a nonlead glass for covering an electrode, which comprises, in mol %, $B_2O_3$ 15-65%, $SiO_2$ 2-38%, MgO 2-30%, MgO+CaO+SrO+BaO 5-45%, $Li_2O$ 1-15%, $Li_2O+Na_2O+K_2O$ 2-25% and others, and which comprises ZnO 0-15%. Provided is a nonlead glass for covering an electrode, which comprises, in mol %, $B_2O_3$ 25-65%, $SiO_2$ 2-38%, MgO 2-30%, MgO+CaO+SrO+BaO 5-45%, $Li_2O+Na_2O+K_2O$ 2-25%, $Al_2O_3$ 0-30, TiO 0-10% and ZnO 0-15%.

21 Claims, No Drawings

GLASS FOR COVERING ELECTRODE

This application is a divisional of U.S. Ser. No. 11/581,400, filed on Oct. 17, 2006 and now abandoned.

TECHNICAL FIELD

The present invention relates to an electrode-covering glass suitable for insulating covering of electrodes in cases where a transparent electrode of ITO (indium oxide doped with tin), tin oxide, or the like is formed on a glass substrate, or where a Cr—Cu—Cr electrode or an Ag electrode is formed on a part of a surface of the transparent electrode.

BACKGROUND ART

A plasma display panel (PDP) device is a representative large-screen full-color display device. A plurality of display electrode pairs for inducing surface discharge are formed on a display-side substrate (front substrate) of the PDP, while address electrodes perpendicular to the display electrode pairs, stripe-shaped barrier ribs and fluorescent layers covering them are formed on a back-side substrate (back substrate).

The PDP is driven as follows. Namely, a large voltage is applied to a display electrode pair to reset, and discharge is induced between one of the display electrode pair and the corresponding address electrode. By utilizing a wall charge generated by the discharge, a sustaining voltage is applied between the display electrode pair to cause sustaining discharge.

This display electrode pair is used as scanning electrodes for plasma discharge, and a transparent dielectric layer, typically, with a thickness of from 20 to 30 μm is formed thereon for sustainment of discharge.

Each of the scanning electrodes is normally composed of a transparent electrode of ITO or the like and a bus electrodes such as a Cr—Cu—Cr electrode and an Ag electrode formed on a part of a surface of the transparent electrode.

A low melting-point glass containing PbO has been used for the transparent dielectric layer, but electrode-covering low melting-point glasses containing no PbO were recently proposed (cf. JP-A-2004-146357 and JP-A-2001-195989).

JP-A-2004-146357 proposed nonlead glasses containing, in mass %, BaO 3-25%, ZnO 25-60%, $B_2O_3$ 15-35%, $SiO_2$ 3-30%, $Li_2O$ 0.2-6% and $Al_2O_3$ 0-1.5% for the purpose of making bubbles less likely to remain in the dielectric layer and preventing large bubbles from remaining near the electrode.

JP-A-2001-195989 proposed nonlead glasses containing ZnO and an alkali metal oxide of at most 10% by weight and having a low permittivity for the purpose of avoiding increase of power consumption even in a larger-sized screen and higher resolution.

DISCLOSURE OF THE INVENTION

Problems to be Solved by the Invention

The glasses proposed in JP-A-2004-146357 are described as those in which when they cover an Ag electrode, large bubbles are less likely to remain near the electrode, but crystals are likely to precipitate when they are calcined (glasses in Examples 44 and 45 described below).

The glasses proposed in JP-A-2001-195989 are described as those that have a low permittivity and a low softening point, and that are resistant to yellowing of the dielectric layer due to the Ag electrode. However, when the resistivity ($\rho$) at 150° C. was measured for glasses expected to reduce the number of bubbles remaining near the electrode in use for covering the Cr—Cu—Cr electrode, most of them had $\rho$ as low as less than $10^{12}$ Ω·cm, and thus they were not necessarily said to be excellent in the insulating properties (glasses in Examples 46, 48 to 53 described below). Furthermore, the glasses with $\rho$ of at least $10^{12}$ Ω·cm among the above glasses were subjected to calcination in the form of powder and at a temperature (575° C.) described in the publication, but they did not soften and flow, and hardly calcined (a glass in Example 47 described below).

An object of the present invention is to provide a glass for covering an electrode which can solve the above problems.

Means for Solving the Problem

The present invention provides a glass for covering an electrode, the glass consisting essentially, in mol % based on oxides below, of $B_2O_3$ 15-65%, $SiO_2$ 2-38%, MgO 2-30%, MgO+CaO+SrO+BaO 5-45%, $Li_2O$ 1-15%, $Li_2O+Na_2O+K_2O$ 2-25%, $Al_2O_3$ 0-30% and $P_2O_5$ 0-15%, wherein if ZnO is contained, a content of ZnO is at most 15 mol %, and wherein no PbO is contained (Glass 1 of the present invention).

Furthermore, the present invention provides a glass for covering an electrode, the glass consisting essentially, in mol % based on oxides below, of $B_2O_3$ 25-65%, $SiO_2$ 2-38%, MgO 2-30%, MgO+CaO+SrO+BaO 5-45%, $Li_2O$ 1-15%, $Li_2O+Na_2O+K_2O$ 2-25%, $Al_2O_3$ 0-30%, $TiO_2$ 0-10% and ZnO 0-15%, wherein no PbO is contained (Glass 2 of the present invention).

The inventor of the present invention found that in a $B_2O_3$—$SiO_2$—RO—$R_2O$ type electrode-covering glass (RO represents an alkaline earth metal oxide and $R_2O$ represents an alkali metal oxide), to reduce the content of ZnO or to eliminate ZnO is effective for solving the problem that large bubbles remain near the electrode, among the above problems, and thereby accomplished the present invention.

Effects of the Present Invention

When the glass for covering an electrode according to the present invention (hereinafter, referred to as "the glass of the present invention") is used to cover the electrodes on the front substrate of PDP, the number of large bubbles is reduced in the electrode-covering glass layer (transparent dielectric layer) on the front substrate of PDP. This effect is remarkable, particularly, in cases where the Cr—Cu—Cr electrode as described above is formed as the bus electrode on a part of a surface of the transparent dielectric layer.

Furthermore, according to a preferred embodiment of the present invention, the electrical insulation of the transparent dielectric layer can be enhanced, or the electrodes and others on the front substrate of PDP can be covered with a high water resistant glass.

BEST MODE FOR CARRYING OUT THE INVENTION

The glass of the present invention is usually used for covering electrodes after subjected to powderization. The powderization is usually carried out by grinding and classifying the glass.

In a case where the electrodes are covered with a glass paste, the powdered glass of the present invention (hereinafter referred to as "glass powder of the present invention") is kneaded with a vehicle to obtain a glass paste. The glass paste is applied on a glass substrate on which electrodes such as transparent electrodes are formed, and calcined, thereby forming a glass layer covering the transparent electrodes. In the production of the front substrate of PDP, the calcination is conducted typically at a temperature of at most 600° C.

In a case where the electrodes are covered with a green sheet, the glass powder of the present invention is kneaded with a resin and the resulting kneaded product is applied onto a supporting film such as a polyethylene film to obtain a green sheet. This green sheet is transferred, for example, onto electrodes formed on a glass substrate, and calcined, thereby forming a glass layer covering the electrodes.

A mass mean diameter ($D_{50}$) of the glass powder of the present invention is preferably at least 0.5 μm. If $D_{50}$ is less than 0.5 μm, it may take a too long time for powderization. $D_{50}$ is more preferably at least 0.7 μm. On the other hand, $D_{50}$ is preferably at most 4 μm, more preferably at most 3 μm.

The maximum diameter of the glass powder of the present invention is preferably at most 20 μm. If the maximum diameter exceeds 20 μm, the following problem could arise in use for formation of a glass layer for covering the electrodes of PDP, the thickness of which is required to be usually at most 30 μm: the surface of the glass layer becomes so uneven as to distort an image on the PDP. The maximum diameter is more preferably at most 10 μm.

The glass of the present invention preferably has an average linear expansion coefficient (α) of from $70 \times 10^{-7}$ to $90 \times 10^{-7}/°$ C., typically from $70 \times 10^{-7}$ to $85 \times 10^{-7}/°$ C. in a temperature range of from 50 to 350° C.

The glass of the present invention preferably has a softening point (Ts) of at most 650° C. If it exceeds 650° C., it may be difficult to obtain a glass layer having a high transmittance by the calcination at a temperature of at most 600° C.

More preferably, α is from $70 \times 10^{-7}$ to $90 \times 10^{-7}/°$ C. and Ts is at most 650° C.; typically, α is from $70 \times 10^{-7}$ to $85 \times 10^{-7}/°$ C. and Ts is at most 650° C.

The glass of the present invention preferably has a relative permittivity (ε) of at most 9 at the frequency of 1 MHz. If ε exceeds 9, the driving voltage and discharge sustaining voltage will become so high as to decrease the luminous efficiency, or it will result in increase of power consumption. The relative permittivity is more preferably at most 8.5, particularly preferably at most 8.

The glass of the present invention preferably has a resistivity (ρ) of at least $10^{12}$ Ω·cm at 150° C. If ρ is less than $10^{12}$ Ω·cm, migration of Ag and Cu will be likely to occur when the Cr—Cu—Cr electrode, the Ag electrode or the like is formed as the bus electrode on a part of the surface of the transparent electrode.

Now, the composition of the glass of the present invention will be described in such representation that mol % is simply indicated by %. First, Glass 1 of the present invention will be explained.

$B_2O_3$ is a component to stabilize the glass or to lower Ts, and is essential. If $B_2O_3$ is less than 15%, Ts tends to be too high, and it is preferably at least 20%, typically at least 26%. If $B_2O_3$ exceeds 65%, vitrification tends to be difficult, and it is preferably at most 60%, typically at most 54%.

$SiO_2$ is a component to form a framework of the glass, and is essential. If $SiO_2$ is less than 2%, vitrification tends to be difficult or crystals are likely to precipitate during the calcination, and it is preferably at least 2.5%. If $SiO_2$ exceeds 38%, Ts becomes too high. One of preferred embodiments may be a glass wherein $SiO_2$ is contained at most 30%, and in that case, $SiO_2$ is more preferably at most 25%, typically at most 22%.

MgO is a component to lower α, and is essential. If MgO is less than 2%, α becomes large. MgO is typically from 5 to 25%.

CaO, SrO and BaO are components to lower Ts or α. None of them is essential where MgO is at least 5%, while at least one of them must be contained where MgO is less than 5%.

If the total content of the four components including MgO in addition to these three components is less than 5%, Ts becomes too high. The total content is preferably at least 10%. If the above-mentioned total content exceeds 45%, vitrification becomes difficult. The total content is preferably at most 40%, typically at most 33%.

When CaO is contained, the content thereof is preferably at most 20%, more preferably at most 15%, typically in a range of from 1 to 9%.

When SrO is contained, the content thereof is preferably at most 20%, more preferably at most 15%, typically in a range of from 1 to 6%.

When BaO is contained, the content thereof is preferably at most 20%, more preferably at most 15%, typically in a range of from 1 to 6%.

Preferably, CaO is from 0 to 20%, SrO is from 0 to 20%, and BaO is from 0 to 20%.

$Li_2O$ is a component to facilitate vitrification or to lower Ts, and is essential. If $Li_2O$ is less than 1%, vitrification tends to be difficult, or Ts becomes high. On the other hand, if it exceeds 15%, electrical insulation tends to deteriorate or α becomes too large. $Li_2O$ is typically from 3 to 9%.

$Na_2O$ and $K_2O$ are components to facilitate vitrification or to lower Ts. In a case where $Li_2O$ is at least 2%, neither of them is essential, while in a case where $Li_2O$ is less than 2%, at least one of them must be contained.

If the total content of the three components including $Li_2O$ in addition to these two components is less than 2%, Ts becomes too high. The total content is preferably at least 5%, typically at least 8%. If the above-mentioned total content exceeds 25%, Ts becomes too low or α becomes too large. It is preferably at most 20%, typically at most 17%.

When $Na_2O$ is contained, the content thereof is preferably at most 15%, more preferably at most 10%, typically from 1 to 9%.

When $K_2O$ is contained, the content thereof is preferably at most 15%, more preferably at most 10%, typically from 1 to 9%.

Preferably, $Na_2O$ is from 0 to 15%, and $K_2O$ is from 0 to 15%.

$Al_2O_3$ is not essential, but it may be contained up to 30% in order to stabilize the glass, for example. If $Al_2O_3$ exceeds 30%, vitrification tends to be difficult, or crystals are likely to precipitate during the calcination. $Al_2O_3$ is preferably at most 25%. When $Al_2O_3$ is contained, the content thereof is typically at least 1%.

$P_2O_5$ is not essential, but it may be contained up to 15%, for example, in order to improve the fluidity of the glass to, in turn, improve the smoothness of the surface of the glass layer formed by calcination. $P_2O_5$ is preferably at most 10%, typically at most 7%. When $P_2O_5$ is contained, the content thereof is typically at least 0.5%.

Typically, $B_2O_3$ is from 20 to 60%, MgO is from 5 to 25%, MgO+CaO+SrO+BaO is from 10 to 40%, $Li_2O+Na_2O+K_2O$ is from 5 to 20%, and $Al_2O_3$ is from 0 to 25%.

Glass 1 of the present invention consists essentially of the above-mentioned components, but may contain other components as long as the purpose of the present invention is not impaired. In this case, the total content of the components other than the above-mentioned components is preferably at most 15%, typically at most 10%, more typically at most 5%.

Examples of such components include $TiO_2$, $ZrO_2$, $SnO_2$, $CeO_2$, CuO and CoO. These components are usually added in order to control α, Ts, chemical durability, transmittance of the glass layer, stability of the glass, and so on.

It may be preferable to add $CeO_2$, CuO and CoO among these components in a total content of $CeO_2$, CuO and CoO of at most 5%, typically at most 0.9% in order to suppress a phenomenon in which the glass is colored by carbon remaining in the glass after the calcination because of insufficient debinder in calcination, in order to suppress a silver-color phenomenon appearing in covering silver electrodes, and so on.

When Glass 1 of the present invention contains ZnO, its content is at most 15%. If ZnO exceeds 15%, the transmittance of the glass layer becomes low or large bubbles are likely to exist in the glass layer. ZnO is preferably at most 12%, typically less than 5%, more typically at most 2%. There are preferred cases where Glass 1 contains no ZnO. Even in the preferred cases, ZnO may be contained at a level of an impurity, and in this case, the content is typically at most 0.1%, more typically at most 0.01%.

Next, Glass 2 of the present invention will be explained. The glass is an embodiment suitable for cases where Ts is desired to be reduced, for example, a case where Ts is desired to be at most 600° C.

$B_2O_3$ is a component to stabilize the glass or to lower Ts, and is essential. If $B_2O_3$ is less than 25%, Ts tends to be too high, and it is typically at least 35%. If $B_2O_3$ exceeds 65%, vitrification tends to be difficult, and it is typically at most 50%.

$SiO_2$ is a component to form a framework of the glass, and is essential. If $SiO_2$ is less than 2%, vitrification tends to be difficult or crystals are likely to precipitate during the calcination, and it is preferably at least 2.5%. If $SiO_2$ exceeds 38%, Ts becomes too high. One of preferred embodiments is a glass containing $SiO_2$ of at most 30%, and in that case $SiO_2$ is typically at most 20%.

MgO is a component to lower α, and is essential. If it is less than 2%, α becomes large. MgO is typically from 5 to 20%.

CaO, SrO and BaO are components to lower Ts or α. None of them is essential where MgO is at least 5%, while at least one of them must be contained where MgO is less than 5%.

If the total content of the four components including MgO in addition to these three components is less than 5%, Ts becomes too high. The total content is preferably at least 10%. If the above-mentioned total content exceeds 45%, vitrification becomes difficult. The total content is typically at most 30%.

When CaO is contained, the content thereof is typically at most 10%.

When SrO is contained, the content thereof is typically at most 5%.

When BaO is contained, the content thereof is typically at most 5%.

Typically, CaO is from 0 to 10%, SrO is from 0 to 5%, and BaO is from 0 to 5%.

$Li_2O$ is a component to facilitate vitrification or to lower Ts, and is essential. If $Li_2O$ is less than 1%, vitrification tends to be difficult and Ts becomes high. On the other hand, if it exceeds 15%, electrical insulation tends to deteriorate or α becomes too large. $Li_2O$ is typically from 3 to 9%.

$Na_2O$ and $K_2O$ are components to facilitate vitrification or to lower Ts. In a case where $Li_2O$ is at least 2%, neither of them is essential, while in a case where $Li_2O$ is less than 2%, at least one of them must be contained.

If the total content of the three components including $Li_2O$ in addition to these two components is less than 2%, Ts becomes too high. The total content is preferably at least 5%. If the above-mentioned total content exceeds 25%, Ts becomes too low or, α or ε becomes too large. The total content is preferably at most 20%.

When $Na_2O$ is contained, the content thereof is preferably at most 15%, more preferably at most 10%, typically from 1 to 9%.

When $K_2O$ is contained, the content thereof is preferably at most 15%, more preferably at most 10%, typically from 1 to 9%.

Preferably, $Na_2O$ is from 0 to 15% and $K_2O$ is from 0 to 15%.

$Al_2O_3$ is not essential, but may be contained up to 30% in order to stabilize the glass, for example. If it exceeds 30%, vitrification tends to be difficult or crystals are likely to precipitate during the calcination. $Al_2O_3$ is typically at most 15%. When $Al_2O_3$ is contained, the content thereof is typically at least 1%.

$TiO_2$ is not essential, but it may be contained up to 10% in order to control α, for example. It is typically at most 7%. If $TiO_2$ is contained, the content thereof is typically at least 1%.

ZnO is not essential, but it is a component to lower Ts and may be contained up to 15%. If ZnO exceeds 15%, the above-mentioned large bubbles are likely to appear, or ε becomes large. ZnO is preferably at most 12%.

Typically, $B_2O_3$ is from 35 to 50%, $SiO_2$ is from 2 to 20%, MgO is from 5 to 20%, MgO+CaO+SrO+BaO is from 5 to 30%, $Li_2O+Na_2O+K_2O$ is from 5 to 20%, $Al_2O_3$ is from 0 to 15%, and ZnO is from 0 to 12%.

Glass 2 of the present invention consists essentially of the above-mentioned components, but may contain other components as long as the purpose of the present invention is not impaired. In this case, the total content of the components other than the above-mentioned components is typically at most 10%, more typically at most 5%.

Example of such components include $ZrO_2$, $SnO_2$, $P_2O_5$, $CeO_2$, CuO and CoO. These components are usually added in order to control α, Ts, chemical durability, transmittance of the glass layer, stability of the glass, fluidity of the glass, and so on.

It may be preferable to add $CeO_2$, CuO and CoO among these components in a total content of $CeO_2$, CuO and CoO of at most 5%, typically at most 0.9% in order to suppress a phenomenon in which the glass is colored by carbon remaining in the glass after the calcination because of insufficient debinder in calcination, in order to suppress a silver-color phenomenon appearing in covering silver electrodes, and so on.

In Glass 1 and Glass 2 of the present invention, when an improvement is desired in water resistance, the glass is preferably one comprising in mol %, $B_2O_3$ 36-44%, $SiO_2$ 17-24%, MgO 5-15%, $Li_2O+K_2O$ 5-20%, $Al_2O_3$ 6-14% and ZnO 0-12%, or preferably one comprising $B_2O_3$ 28-39%, $SiO_2$ 23-38%, MgO 5-15%, $Li_2O+K_2O$ 5-20%, $Al_2O_3$ 0-4%, $SiO_2+Al_2O_3$ 23-38% and ZnO 0-12%.

Furthermore, Glass 1 and Glass 2 of the present invention contain no PbO and, preferably, they contain no $Bi_2O_3$, either.

EXAMPLES

Raw materials were formulated and mixed so as to obtain compositions in mol % representation in the column of from $B_2O_3$ to ZnO or to $CeO_2$ in tables. Then, each of these mixtures was heated to melt for 60 minutes with a platinum crucible at a temperature of from 1250 to 1350° C. in Examples 1 to 15, 32, 37, 38 and 41 to 45, at a temperature of from 1150 to 1350° C. in Examples 16 to 31, 39 and 40, at 1350° C. in Example 33 and at 1250° C. in Examples 34 to 36 and 46 to 53. Examples 1 to 36 are examples of the present invention and Examples 37 to 53 are comparative examples. It should be noted that Examples 44 and 45 correspond to Examples 2 and 10 of JP-A-2004-146357 and that Examples 46 to 53 correspond to NO. 31 to 38 in Table 5 of JP-A-2001-195989, respectively. Furthermore, in the tables, RO represents MgO+CaO+SrO+BaO and $R_2O$ represents $Li_2O+Na_2O+K_2O$.

A part of each molten glass obtained was poured into a stainless-steel frame and gradually cooled. Each glass gradually cooled was processed into a cylindrical shape with a length of 20 mm and a diameter of 5 mm to obtain a sample, and it was subjected to measurement of the above-mentioned α by means of a longitudinal differential detection system thermal dilatometer (TD5010SA-N) manufactured by Bruker AXS K.K. The results are shown in the Tables (unit: $10^{-7}/°$ C.).

A part of the rest of the above molten glass was poured into a stainless-steel frame and gradually cooled. The gradually cooled glass was processed into a disc shape with a diameter of 40 mm and a thickness of 3 mm, and electrodes were formed on both sides thereof by deposition of aluminum to obtain a sample. It was subjected to measurement of the above-mentioned E by an electrode-contact method with LCR meter 4192A manufactured by YOKOGAWA-Hewlett-Packard Company. The results are shown in the Tables.

The remaining molten glass was poured into stainless-steel rollers to process into flake. The resulting glass flake was subjected to dry grind for 16 hours by an alumina ball mill, followed by airflow classification, to prepare glass powder having the $D_{50}$ of from 2 to 4 μm.

This glass powder as a sample was subjected to measurement of the above-mentioned Ts by means of a differential thermal analyzer (DTA). The results are shown in the Tables (unit: ° C.). It should be noted that Example 47 corresponds to NO. 32 in Table 5 of JP-A-2001-195989 in which the calcination was conducted at 575° C. However, the sample was calcined at the same temperature of 575° C., but it was not sintered at all.

Furthermore, 100 g of the above glass powder in each of Examples 1 to 40 and 42 to 45 was kneaded with 25 g of an organic vehicle in which 10% by mass of ethyl cellulose was dissolved in α-terpineol and others, to prepare a paste ink (glass paste). The paste ink was uniformly screen-printed on a soda lime silicate glass substrate (α: $87\times10^{-7}/°$ C.) with a size of 50 mm×75 mm and a thickness of 2.8 mm, so that a film thickness after the calcination became 30 μm, and dried at 120° C. for 10 minutes. Then the glass substrate was heated at a temperature-raising rate of 10° C. per minute up to 570° C. in Examples 16 to 36 and up to 600° C. in Examples 1 to 15, 37 to 40 and 42 to 45 and maintained at the temperature for 30 minutes to 45 minutes to conduct calcination, whereby a glass layer was formed on the glass substrate.

This glass substrate with the glass layer was subjected to measurement of visible light transmittance (Tv) by standard light source C. The results are shown in the Tables (unit: %) and Tv is preferably at least 75%, more preferably at least 80%.

Furthermore, the glass layer of the glass substrate with the glass layer was observed by means of an optical microscope (magnification: 100), thereby observing whether or not there was precipitation of crystals. In the tables, the results are shown in the column of precipitated crystals, and any glass with precipitated crystals is hardly used as the transparent dielectric layer on the front substrate of the PDP.

Furthermore, the above paste ink in each of Examples 1 to 40 and 42 was applied onto a glass substrate with a size of 25 mm×50 mm and a thickness of 2.8 mm on one surface of which transparent electrodes of ITO and metal electrodes of Cr—Cu—Cr were patterned in line shape, and heated up to 570° C. in Examples 16 to 36 and up to 600° C. in Examples 1 to 15, 37 to 40 and 42 at a temperature-raising rate of 10° C. per minute, and retained for 15 to 30 minutes, thereby conducting calcination to form a glass layer for covering the electrodes. Bubbles with a diameter of at least 20 μm existing near the electrode were observed in a range of 25 mm×25 mm of the glass layer with an optical microscope (magnification: 20) and the number of bubbles was counted. The results are shown in the column of the number of bubbles in the tables (unit: bubble) and the number of bubbles is preferably at most 4, more preferably at most 3.

In addition, ρ of each glass was measured as follows. Namely, the molten glass was poured into a stainless-steel frame, strain was removed by a heat treatment, the glass was processed into a diameter of 40 mm and a thickness of 3 mm, and aluminum was deposited as electrodes on both sides of the glass to obtain a sample. The sample was subjected to measurement of a volume resistivity at 100 V and 150° C. by means of a digital ultrahigh resistance/micro wattmeter (R8340A) manufactured by ADVANTEST CORPORATION. A common logarithm of ρ (unit: Ω·cm) was shown in the column of log ρ in the tables, and values of log ρ in Examples 1, 5, 6, 10, 13 to 15, 23, 25 and 30 are estimated values.

Moreover, a water resistant test was conducted in the following manner with the glasses of Examples 33 to 36. Namely, the molten glass was poured into a stainless-steel frame and strain was removed by a heat treatment. The glass was then processed into a diameter of 5 mm and a length of 50 mm, and immersed in water at 80° C. for 24 hours. Weights before and after the immersion were measured and the difference between them was divided by the weight before the immersion to obtain a weight-reducing rate Rw (unit: %). The results are shown in the Tables. The glasses of Examples 35 and 36, which are preferred embodiments for improvement in water resistance, showed Rw of at most 1.0%, and thus were found to have high water resistance.

It should be noted that "-" indicated in the tables means that no measurement was conducted.

TABLE 1

| | Example | | | | | | | | |
|---|---|---|---|---|---|---|---|---|---|
| | 1 | 2 | 3 | 4 | 5 | 6 | 7 | 8 | 9 |
| $B_2O_3$ | 27.5 | 32.5 | 32.5 | 35.0 | 50.0 | 30.7 | 50.0 | 50.0 | 50.0 |
| $SiO_2$ | 15.0 | 10.0 | 10.0 | 10.0 | 12.5 | 9.3 | 12.5 | 20.0 | 15.0 |
| MgO | 12.5 | 12.5 | 12.5 | 12.5 | 12.5 | 11.8 | 12.5 | 12.5 | 12.5 |
| CaO | 7.5 | 7.5 | 2.5 | 2.5 | 2.5 | 2.4 | 5.0 | 0 | 2.5 |
| SrO | 5.0 | 5.0 | 2.5 | 2.5 | 2.5 | 2.4 | 0 | 0 | 2.5 |
| BaO | 5.0 | 5.0 | 2.5 | 2.5 | 2.5 | 2.4 | 0 | 0 | 2.5 |
| $Li_2O$ | 5.0 | 5.0 | 7.5 | 7.5 | 7.5 | 7.0 | 7.5 | 7.5 | 7.5 |
| $Na_2O$ | 5.0 | 5.0 | 5.0 | 0 | 0 | 4.7 | 7.5 | 7.5 | 0 |
| $K_2O$ | 0 | 0 | 2.5 | 7.5 | 5.0 | 2.4 | 0 | 0 | 5.0 |

TABLE 1-continued

| | Example | | | | | | | | |
|---|---|---|---|---|---|---|---|---|---|
| | 1 | 2 | 3 | 4 | 5 | 6 | 7 | 8 | 9 |
| $Al_2O_3$ | 17.5 | 17.5 | 22.5 | 20.0 | 5.0 | 21.2 | 5.0 | 2.5 | 2.5 |
| $P_2O_5$ | 0 | 0 | 0 | 0 | 0 | 5.7 | 0 | 0 | 0 |
| ZnO | 0 | 0 | 0 | 0 | 0 | 0 | 0 | 0 | 0 |
| RO | 30.0 | 30.0 | 20.0 | 20.0 | 20.0 | 19.0 | 17.5 | 12.5 | 20.0 |
| $R_2O$ | 10.0 | 10.0 | 15.0 | 15.0 | 12.5 | 14.1 | 15.0 | 15.0 | 12.5 |
| α | 83 | 82 | 81 | 84 | 78 | 80 | 81 | 78 | 77 |
| Ts | 644 | 637 | 621 | 621 | 630 | 631 | 606 | 612 | 636 |
| ε | 8.0 | 8.0 | 7.4 | 7.0 | 7.0 | 7.2 | 7.5 | 6.5 | 7.1 |
| Tv | 81 | 82 | 85 | 84 | 83 | 84 | 84 | 83 | 84 |
| Precipitated crystals | Absent | Absent | Absent | Absent | Absent | Absent | Absent | Absent | Absent |
| Number of bubbles | 1 | 0 | 1 | 1 | 0 | 0 | 0 | 0 | 1 |
| log ρ | 13.4 | 14.0 | 12.7 | 12.8 | 14.6 | 13.9 | 12.8 | 12.4 | 14.5 |

TABLE 2

| | Example | | | | | |
|---|---|---|---|---|---|---|
| | 10 | 11 | 12 | 13 | 14 | 15 |
| $B_2O_3$ | 50.0 | 40.0 | 37.5 | 40.0 | 47.0 | 49.4 |
| $SiO_2$ | 17.5 | 2.5 | 5.0 | 10.0 | 12.4 | 19.8 |
| MgO | 12.5 | 20.0 | 15.0 | 10.0 | 14.9 | 12.3 |
| CaO | 2.5 | 0 | 5.0 | 5.0 | 2.4 | 0 |
| SrO | 2.5 | 0 | 5.0 | 0 | 2.4 | 0 |
| BaO | 2.5 | 7.5 | 2.5 | 0 | 2.5 | 0 |
| $Li_2O$ | 7.5 | 5.0 | 7.5 | 7.5 | 7.4 | 7.4 |
| $Na_2O$ | 0 | 5.0 | 5.0 | 7.5 | 5.0 | 7.4 |
| $K_2O$ | 5.0 | 0 | 0 | 0 | 0 | 0 |
| $Al_2O_3$ | 0 | 20.0 | 17.5 | 20.0 | 5.0 | 2.5 |
| $P_2O_5$ | 0 | 0 | 0 | 0 | 1.0 | 1.2 |
| ZnO | 0 | 0 | 0 | 0 | 0 | 0 |
| RO | 20.0 | 27.5 | 27.5 | 15.0 | 22.2 | 12.3 |
| $R_2O$ | 12.5 | 10.0 | 12.5 | 15.0 | 12.4 | 14.8 |
| α | 79 | 74 | 84 | 77 | 80 | 81 |
| Ts | 636 | 636 | 610 | 620 | 621 | 606 |
| ε | 7.0 | 7.6 | 7.8 | 6.6 | 7.2 | 6.5 |
| Tv | 85 | 83 | 82 | 85 | 84 | 84 |
| Precipitated crystals | Absent | Absent | Absent | Absent | Absent | Absent |
| Number of bubbles | 0 | 2 | 0 | 0 | 1 | 1 |
| log ρ | 14.4 | 13.6 | 13.2 | 13.1 | 14.4 | 12.7 |

TABLE 3

| | Examples | | | | | | | | |
|---|---|---|---|---|---|---|---|---|---|
| | 16 | 17 | 18 | 19 | 20 | 21 | 22 | 23 | 24 |
| $B_2O_3$ | 37.3 | 37.3 | 42.3 | 44.8 | 44.8 | 44.8 | 44.8 | 45.0 | 47.3 |
| $SiO_2$ | 14.9 | 10.0 | 10.0 | 14.9 | 14.9 | 10.0 | 10.0 | 12.5 | 14.9 |
| MgO | 7.5 | 14.9 | 10.0 | 10.0 | 10.0 | 10.0 | 10.0 | 10.0 | 10.0 |
| CaO | 5.0 | 7.5 | 2.5 | 5.0 | 0 | 5.0 | 2.5 | 0 | 0 |
| SrO | 0 | 0 | 0 | 0 | 0 | 0 | 0 | 2.5 | 0 |
| BaO | 0 | 0 | 0 | 0 | 0 | 0 | 0 | 2.5 | 0 |
| $Li_2O$ | 7.5 | 5.0 | 5.0 | 7.5 | 5.0 | 7.5 | 7.5 | 7.5 | 5.0 |
| $Na_2O$ | 5.0 | 5.0 | 7.5 | 5.0 | 5.0 | 5.0 | 5.0 | 5.0 | 5.0 |
| $K_2O$ | 2.5 | 2.5 | 2.5 | 2.5 | 5.0 | 2.5 | 2.5 | 2.5 | 5.0 |
| $Al_2O_3$ | 10.0 | 7.5 | 10.0 | 5.0 | 5.0 | 10.0 | 10.0 | 5.0 | 5.0 |
| $TiO_2$ | 0 | 0 | 0 | 0 | 0 | 5.0 | 0 | 0 | 0 |
| ZnO | 10.0 | 10.0 | 10.0 | 5.0 | 10.0 | 0 | 7.5 | 7 | 7.5 |
| CuO | 0 | 0 | 0 | 0.2 | 0.2 | 0.2 | 0.2 | 0.25 | 0.2 |
| $CeO_2$ | 0.5 | 0.5 | 0.5 | 0.2 | 0.2 | 0.2 | 0.2 | 0.25 | 0.2 |
| RO | 12.5 | 22.4 | 12.5 | 15 | 10 | 15 | 12.5 | 15 | 10 |
| $R_2O$ | 15 | 12.5 | 15 | 15 | 15 | 15 | 15 | 15 | 15 |
| α | 81 | 85 | 83 | 81 | 81 | 81 | 79 | 85 | 80 |
| Ts | 587 | 595 | 586 | 596 | 586 | 595 | 590 | 585 | 590 |
| ε | 7.3 | 7.6 | 7.3 | 7.2 | 7 | 7.4 | 7.1 | 7.2 | 6.8 |
| Tv | 82 | 79 | 81 | 77 | 81 | 80 | 80 | 82 | 78 |
| Precipitated crystals | Absent | Absent | Absent | Absent | Absent | Absent | Absent | Absent | Absent |
| Number of bubbles | 2 | 3 | 2 | 2 | 4 | 3 | 2 | 2 | 2 |
| log ρ | 12.5 | 13.1 | 12.8 | 12.7 | 13.0 | 12.3 | 14.0 | 13.8 | 13.5 |

TABLE 4

| | Examples | | | | | | | |
|---|---|---|---|---|---|---|---|---|
| | 25 | 26 | 27 | 28 | 29 | 30 | 31 | 32 |
| $B_2O_3$ | 47.3 | 47.4 | 47.5 | 47.3 | 47.3 | 47.0 | 47.3 | 22.5 |
| $SiO_2$ | 14.9 | 15.0 | 15.0 | 14.9 | 14.9 | 12.5 | 14.9 | 20.0 |
| MgO | 10.0 | 10.0 | 10.0 | 10.0 | 10.0 | 10.0 | 10.0 | 10.0 |
| CaO | 0 | 0 | 0 | 0 | 0 | 0 | 0 | 5.0 |
| SrO | 0 | 0 | 0 | 0 | 0 | 0 | 0 | 5.0 |
| BaO | 0 | 0 | 0 | 0 | 0 | 0 | 0 | 5.0 |
| $Li_2O$ | 7.5 | 7.5 | 7.5 | 7.5 | 7.5 | 7.5 | 7.5 | 5.0 |
| $Na_2O$ | 5.0 | 5.0 | 5.0 | 0 | 7.5 | 5.0 | 5.0 | 5.0 |
| $K_2O$ | 2.5 | 2.5 | 2.5 | 7.5 | 0 | 2.5 | 2.5 | 0 |
| $Al_2O_3$ | 5.0 | 5.0 | 5.0 | 5.0 | 5.0 | 5.0 | 5.0 | 12.5 |
| ZnO | 7.5 | 7.5 | 7.5 | 7.5 | 7.5 | 10.0 | 7.5 | 10.0 |
| CoO | 0 | 0 | 0 | 0 | 0 | 0 | 0.1 | 0 |
| CuO | 0.2 | 0.1 | 0 | 0.2 | 0.2 | 0.6 | 0 | 0 |
| $CeO_2$ | 0.2 | 0.1 | 0 | 0.2 | 0.2 | 0 | 0.4 | 0 |
| RO | 10 | 10 | 10 | 10 | 10 | 10 | 10 | 25.0 |
| $R_2O$ | 15 | 15 | 15 | 15 | 15 | 15 | 15 | 10.0 |
| α | 77 | 78 | 78 | 77 | 78 | 78 | 78 | 85 |
| Ts | 590 | 591 | 590 | 593 | 592 | 587 | 588 | 628 |
| ε | 6.8 | 6.8 | 6.8 | 6.8 | 6.9 | 6.7 | 6.8 | 8.2 |
| Tv | 78 | 76 | 82 | 81 | 79 | 82 | 82 | 83 |
| Precipitated crystals | Absent | Absent | Absent | Absent | Absent | Absent | Absent | Absent |
| Number of bubbles | 1 | 1 | 3 | 2 | 2 | 3 | 3 | 4 |
| log ρ | 13.3 | 13.3 | 14.3 | 13.9 | 12.8 | 13.8 | 12.8 | 13.8 |

TABLE 5

| | Examples | | | |
|---|---|---|---|---|
| | 33 | 34 | 35 | 36 |
| $B_2O_3$ | 39.8 | 39.8 | 39.8 | 32.3 |
| $SiO_2$ | 22.4 | 12.4 | 17.4 | 34.8 |
| MgO | 9.9 | 9.9 | 9.9 | 9.9 |
| CaO | 0 | 0 | 0 | 0 |
| SrO | 0 | 0 | 0 | 0 |
| BaO | 0 | 0 | 0 | 0 |
| $Li_2O$ | 7.5 | 7.5 | 7.5 | 7.5 |
| $Na_2O$ | 0 | 0 | 0 | 0 |
| $K_2O$ | 7.5 | 7.5 | 7.5 | 7.5 |
| $Al_2O_3$ | 5 | 14.9 | 9.9 | 0 |
| ZnO | 7.5 | 7.5 | 7.5 | 7.5 |
| CoO | 0.1 | 0.1 | 0.1 | 0.1 |
| CuO | 0 | 0 | 0 | 0 |
| $CeO_2$ | 0.5 | 0.5 | 0.5 | 0.5 |
| RO | 9.9 | 9.9 | 9.9 | 9.9 |
| $R_2O$ | 15 | 15 | 15 | 15 |
| α | 80 | 76 | 79 | 81 |
| Ts | 592 | 600 | 598 | 600 |
| ε | 6.8 | 7.0 | 6.9 | 6.9 |
| Tv | 82 | 82 | 83 | 83 |
| Precipitated crystals | Absent | Absent | Absent | Absent |
| Number of bubbles | 3 | 2 | 3 | 2 |
| log ρ | 12.7 | 13.1 | 13.0 | 12.3 |
| Rw | 1.18 | 1.16 | 0.91 | 0.07 |

TABLE 6

| | Examples | | | | | | | | |
|---|---|---|---|---|---|---|---|---|---|
| | 37 | 38 | 39 | 40 | 41 | 42 | 43 | 44 | 45 |
| $B_2O_3$ | 25.0 | 32.8 | 24.9 | 32.5 | 50.0 | 17.5 | 40.0 | 28.6 | 26.5 |
| $SiO_2$ | 12.7 | 20.4 | 12.6 | 20.2 | 15.0 | 25.0 | 0 | 11.5 | 24.3 |
| MgO | 0 | 0 | 0 | 0 | 0 | 7.5 | 20.0 | 0 | 0 |
| CaO | 4.1 | 0 | 4.1 | 0 | 0 | 5.0 | 5.0 | 0 | 0 |
| SrO | 0 | 0 | 0 | 0 | 5.0 | 5.0 | 0 | 0 | 0 |
| BaO | 2.7 | 9.3 | 2.7 | 9.2 | 20.0 | 2.5 | 7.5 | 4.5 | 4.0 |
| $Li_2O$ | 1.5 | 8.6 | 1.5 | 8.5 | 0 | 5.0 | 5.0 | 5.1 | 5.2 |
| $Na_2O$ | 3.6 | 0 | 3.6 | 0 | 0 | 5.0 | 5.0 | 0 | 6.2 |
| $K_2O$ | 3.2 | 0 | 3.2 | 0 | 0 | 0 | 0 | 1.6 | 0.8 |
| $Al_2O_3$ | 1.5 | 4.8 | 1.5 | 4.8 | 10.0 | 7.5 | 17.5 | 0 | 0 |
| $La_2O_3$ | 0 | 0 | 0 | 0 | 25.0 | 0 | 0 | 0 | 1.9 |
| ZnO | 45.6 | 24.1 | 45.4 | 23.8 | 0 | 20.0 | 0 | 48.7 | 31.0 |
| CuO | 0 | 0 | 0.5 | 0.5 | 0 | 0 | 0 | 0 | 0 |
| $CeO_2$ | 0 | 0 | 0 | 0.5 | 0 | 0 | 0 | 0 | 0 |
| RO | 6.8 | 9.3 | 6.8 | 9.2 | 25.0 | 20.0 | 32.5 | 4.5 | 4.0 |
| $R_2O$ | 8.3 | 8.6 | 8.3 | 8.5 | 0 | 10.0 | 10.0 | 6.8 | 12.2 |

TABLE 6-continued

| | Examples | | | | | | | |
|---|---|---|---|---|---|---|---|---|
| | 37 | 38 | 39 | 40 | 41 | 42 | 43 | 44 | 45 |
| α | 79 | 73 | 79 | 73 | 75 | 89 | 82 | 73 | 81 |
| Ts | 568 | 608 | 568 | 608 | 722 | 612 | 619 | 574 | 587 |
| ε | 8.6 | 8.0 | 8.6 | 8.1 | 7.7 | 8.3 | 8.0 | 8.6 | 8.1 |
| Tv | 83 | 85 | 82 | 82 | — | 82 | 47 | 66 | 73 |
| Precipitated crystals | Absent | Absent | Absent | Absent | — | Absent | Present | Present | Present |
| Number of bubbles | 12 | 17 | 12 | 17 | — | 9 | — | — | — |
| log ρ | — | — | — | — | — | — | — | — | — |

TABLE 7

| | Examples | | | | | | | |
|---|---|---|---|---|---|---|---|---|
| | 46 | 47 | 48 | 49 | 50 | 51 | 52 | 53 |
| $B_2O_3$ | 17.7 | 41.2 | 33.1 | 31.3 | 37.4 | 29.0 | 30.9 | 30.1 |
| $SiO_2$ | 30.7 | 11.9 | 27.4 | 31.1 | 27.1 | 22.4 | 17.9 | 17.4 |
| MgO | 7.6 | 0 | 0 | 0 | 0 | 0 | 0 | 0 |
| CaO | 0 | 9.0 | 0 | 0 | 11.6 | 12.0 | 0 | 0 |
| SrO | 0 | 0 | 0 | 6.0 | 0 | 0 | 0 | 0 |
| BaO | 0 | 0 | 0.9 | 0 | 0 | 0 | 5.6 | 6.8 |
| $Li_2O$ | 20.6 | 7.2 | 17.6 | 20.9 | 10.9 | 11.2 | 19.2 | 23.4 |
| $Na_2O$ | 0 | 0 | 0 | 0 | 0 | 0 | 0 | 0 |
| $K_2O$ | 0 | 0 | 0 | 0 | 0 | 0 | 0 | 0 |
| $Al_2O_3$ | 12.0 | 17.5 | 12.9 | 3.0 | 12.1 | 13.1 | 17.6 | 13.7 |
| ZnO | 11.3 | 13.1 | 8.1 | 7.6 | 0.8 | 12.3 | 8.8 | 8.5 |
| CuO | 0 | 0 | 0 | 0 | 0 | 0 | 0 | 0 |
| $CeO_2$ | 0 | 0 | 0 | 0 | 0 | 0 | 0 | 0 |
| RO | 7.6 | 9.0 | 0.9 | 6.0 | 11.6 | 12.0 | 5.6 | 6.8 |
| $R_2O$ | 20.6 | 7.2 | 17.6 | 20.9 | 10.9 | 11.2 | 19.2 | 23.4 |
| α | 86 | 57 | 72 | 85 | 61 | 68 | 77 | 88 |
| Ts | 583 | 658 | 589 | 593 | 652 | 620 | 579 | 549 |
| ε | 8.1 | 6.7 | 7.5 | 8.3 | 6.8 | 7.6 | 7.9 | 8.3 |
| Tv | — | — | — | — | — | — | — | — |
| Precipitated crystals | — | — | — | — | — | — | — | — |
| Number of bubbles | — | — | — | — | — | — | — | — |
| log ρ | 8.4 | 12.5 | 8.6 | 8.6 | 10.7 | 11.0 | 9.2 | 8.9 |

INDUSTRIAL APPLICABILITY

The glass of the present invention can be used as a glass for covering the transparent electrodes of PDP and the like. The glass of the present invention permits the PDP to be obtained with no or few large bubbles near the transparent electrodes on the front substrate.

The entire disclosures of Japanese Patent Application No. 2004-369295 filed on Dec. 21, 2004, Japanese Patent Application No. 2005-50983 filed on Feb. 25, 2005, Japanese Patent Application No. 2005-188261 filed on Jun. 28, 2005 and Japanese Patent Application No. 2005-244333 filed on Aug. 25, 2005 including specifications, claims, drawings and summaries are incorporated herein by reference in their entireties.

What is claimed is:

1. A glass substrate having an electrode in direct contact with a glass cover, wherein the glass cover consists essentially of, based on oxides below,
$B_2O_3$ 15-65 mol %,
$SiO_2$ 2-38 mol %,
MgO 2-30 mol %,
MgO+CaO+SrO+BaO 5-45 mol %,
$Li_2O$ 1-15 mol %,
$Li_2O+Na_2O+K_2O$ 2-25 mol %,
$Al_2O_3$ 0-30 mol %,
$P_2O_5$ 0-15 mol %,
ZnO 0-15 mol %, and
PbO 0 mol %.

2. The glass substrate having an electrode in direct contact with a glass cover according to claim 1, wherein in the glass cover the ZnO is less than 5 mol %.

3. The glass substrate having an electrode in direct contact with a glass cover according to claim 1, wherein in the glass cover
CaO is from 0 to 20 mol %,
SrO is from 0 to 20 mol %, and
BaO is from 0 to 20 mol %.

4. The glass substrate having an electrode in direct contact with a glass cover according to claim 1, wherein in the glass cover
$B_2O_3$ is from 20 to 60 mol %,
MgO is from 5 to 25 mol %,
MgO+CaO+SrO+BaO is from 10 to 40 mol %,
$Li_2O+Na_2O+K_2O$ is from 5 to 20 mol %, and
$Al_2O_3$ is from 0 to 25 mol %.

5. The glass substrate having an electrode in direct contact with a glass cover according to claim 1, wherein in the glass cover $SiO_2$ is at most 30%.

6. The glass substrate having an electrode in direct contact with a glass cover according to claim 1, wherein in the glass cover
$B_2O_3$ is from 36 to 44 mol %,
$SiO_2$ is from 17 to 24 mol %,
MgO is from 5 to 15 mol %,
$Li_2O+K_2O$ is from 5 to 20 mol %,
$Al_2O_3$ is from 6 to 14 mol %, and
ZnO is from 0 to 12 mol %.

7. The glass substrate having an electrode in direct contact with a glass cover according to claim 1, wherein in the glass cover
$B_2O_3$ is from 28 to 39 mol %,
$SiO_2$ is from 23 to 38 mol %,
MgO is from 5 to 15 mol %,
$Li_2O+K_2O$ is from 5 to 20 mol %,
$Al_2O_3$ is from 0 to 4 mol %,
$SiO_2+Al_2O_3$ is from 23 to 38 mol %, and
ZnO is from 0 to 12 mol %.

8. The glass substrate having an electrode in direct contact with a glass cover according to claim 1, wherein in the glass cover
$Na_2O$ is from 0 to 15 mol %, and
$K_2O$ is from 0 to 15 mol %.

9. The glass substrate having an electrode in direct contact with a glass cover according to claim 1, wherein the glass cover contains no $Bi_2O_3$.

10. The glass substrate having an electrode in direct contact with a glass cover according to claim 1, wherein the glass cover contains no ZnO.

11. The glass substrate having an electrode in direct contact with a glass cover according to claim 1, wherein the glass cover has an average linear expansion coefficient of from $70 \times 10^{-7}$ to $90 \times 10^{-7}/°$ C. in a temperature range of from 50 to 350° C. and a softening point of at most 650° C.

12. The glass substrate having an electrode in direct contact with a glass cover according to claim 1, wherein the glass cover has a relative permittivity of at most 9 at a frequency of 1 MHz.

13. The glass substrate having an electrode in direct contact with a glass cover according to claim 1, wherein the glass cover has a resistivity of at least $10^{12} \Omega \cdot cm$ at 150° C.

14. The glass substrate having an electrode in direct contact with a glass cover according to claim 1, wherein in the glass cover
MgO is from 5 to 30 mol %; and
$P_2O_5$ is from 0.5 to 15 mol %.

15. The glass substrate having an electrode in direct contact with a glass cover according to claim 1, which forms part of a plasma display panel.

16. A glass substrate having an electrode in direct contact with a glass cover, wherein the glass cover consists essentially of, based on oxides below,
$B_2O_3$ 25-65 mol %,
$SiO_2$ 2-38 mol %,
MgO 2-30 mol %,
MgO+CaO+SrO+BaO 5-45 mol %,
$Li_2O$ 1-15 mol %,
$Li_2O+Na_2O+K_2O$ 2-25 mol %,
$Al_2O_3$ 0-30 mol %,
$TiO_2$ 0-10 mol %,
ZnO 0-15 mol %, and
PbO 0 mol %.

17. The glass substrate having an electrode in direct contact with a glass cover according to claim 16, wherein in the glass cover $SiO_2$ is at most 30%.

18. The glass substrate having an electrode in direct contact with a glass cover according to claim 16, wherein in the glass cover
$B_2O_3$ is from 35 to 50 mol %,
$SiO_2$ is from 2 to 20 mol %,
MgO is from 5 to 20 mol %,
MgO+CaO+SrO+BaO is from 5 to 30 mol %,
$Li_2O+Na_2O+K_2O$ is from 5 to 20 mol %,
$Al_2O_3$ is from 0 to 15 mol %, and
ZnO is from 0 to 12 mol %.

19. The glass substrate having an electrode in direct contact with a glass cover according to claim 18, wherein in the glass cover
CaO is from 0 to 10 mol %,
SrO is from 0 to 5 mol %, and
BaO is from 0 to 5 mol %.

20. The glass substrate having an electrode in direct contact with a glass cover according to claim 16, wherein in the glass cover
MgO is from 5 to 30 mol %; and
$P_2O_5$ is from 0.5 to 15 mol %.

21. The glass substrate having an electrode in direct contact with a glass cover according to claim 16, which forms part of a plasma display panel.

* * * * *